(12) United States Patent
Schumann-Olsen et al.

(10) Patent No.: US 7,061,872 B2
(45) Date of Patent: Jun. 13, 2006

(54) MANAGED HDSL REPEATER

(75) Inventors: Reidar Schumann-Olsen, Lier (NO); Steinar Lie, Oslo (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 905 days.

(21) Appl. No.: 10/039,929

(22) Filed: Nov. 6, 2001

(65) Prior Publication Data

US 2002/0057652 A1 May 16, 2002

(30) Foreign Application Priority Data

Nov. 14, 2000 (NO) .................................. 20005754

(51) Int. Cl.
*H04B 17/02* (2006.01)
*H04J 1/16* (2006.01)
*H04J 3/14* (2006.01)

(52) U.S. Cl. ...................... 370/243; 370/246; 370/249; 375/213; 375/221

(58) Field of Classification Search ................ 370/224, 370/249, 241, 244, 246, 540, 243; 375/213, 375/221; 714/4
See application file for complete search history.

(56) References Cited

U.S. PATENT DOCUMENTS

| | | | | |
|---|---|---|---|---|
| 4,402,075 A | * | 8/1983 | Bargeton et al. | ............. 370/246 |
| 4,451,916 A | * | 5/1984 | Casper et al. | ................... 714/4 |
| 4,686,668 A | | 8/1987 | Koseki et al. | ................. 370/15 |
| 5,060,226 A | * | 10/1991 | Gewin et al. | ................ 370/244 |
| 5,243,593 A | * | 9/1993 | Timbs | ......................... 370/360 |
| 5,347,566 A | * | 9/1994 | Law et al. | ................ 379/27.08 |
| 5,422,876 A | * | 6/1995 | Turudic | ......................... 370/249 |
| 5,784,558 A | * | 7/1998 | Emerson et al. | ............ 709/230 |
| 5,892,756 A | * | 4/1999 | Murphy | ....................... 370/241 |
| 5,909,445 A | * | 6/1999 | Schneider | .................... 370/468 |
| 6,208,670 B1 | * | 3/2001 | Milliron et al. | ............. 370/540 |
| 6,891,851 B1 | * | 5/2005 | Demakakos | ................. 370/467 |
| 2002/0061058 A1 | * | 5/2002 | Sommer | ...................... 375/213 |

FOREIGN PATENT DOCUMENTS

| JP | 63074 | 4/1988 |
|---|---|---|
| JP | 05344 | 12/1993 |

* cited by examiner

Primary Examiner—Alpus H. Hsu

(57) ABSTRACT

A repeater for HDSL transmission is presented. The repeater replaces the regenerator commonly used in HDSL by utilizing the activation/deactivation process in the HDSL specification. The repeater is adjusted to detect an activation/deactivation sequence, whereby a flip-flop in the repeater is alternated. A first state of the flip-flop allows transmission passing through the repeater to the terminating point, e.g. a network terminal, and a second state loops transmission back to the originating point, e.g. a line terminal. The looping may then be utilized for maintenance and error detection and recovery. By use of one of the free bit in the overhead channel in the HDSL transmission as an origin bit, wherein "1" is set in the upstream direction, and "0" is set in the downstream direction, it is possible to detect at the line terminal whether there is a loop in the repeater.

10 Claims, 3 Drawing Sheets

MANAGED HDSL REPEATER

FIELD OF THE INVENTION

The present invention is related to Copper line data transmission with HDSL.

BACKGROUND OF THE INVENTION

Transmission with HDSL on copper pairs in the local loop is limited in range by cross talk between pairs in the same cable. To cover the range between telecom operators access points and subscriber locations, the use of transmission regenerators are necessary.

For maintenance and error detection and recovery, fault isolation on such systems must be achievable. A way of obtaining this is to provide the regenerators with a facility of looping the signal back to the access points. The regenerators are not easily accessible (dug into the ground), and thus a remote controlling of this looping is needed.

For HDSL (High speed Digital Subscriber Line) transmission systems, a regenerator management is defined as part of the transmission overhead (EOC) channel between the two endpoints of the line, NT and LT respectively. (References; TS 101135 section 5.7.5 from ETSI and G.991.1 section B5.7.1. from ITU.) The standards define the same set of functions for the regenerator as for the endpoints. FIG. 1 shows the HDSL access line.

In practical systems, the endpoint functionality is expensive, and a limited functionality is very often preferred. The use of the overhead channel for regenerator maintenance also requires that this channel is terminated and regenerated, and this introduces transmission delay and implementation complexity. A regenerator is powered via the transmission lines, and reduction of power consumption, which can be achieved by lower complexity, will extend the distance for remote powering. A pure transmission repeater without overhead channel processing should be a more optimum solution, but it requires another solution of maintenance loop setting.

SUMMARY OF THE INVENTION

It is an object of the present invention to provide an arrangement that eliminates the drawbacks described above. The features defined in the claims enclosed characterize this method.

More specifically, the present invention is related to a regenerator solution by the use of signal repeaters instead of a regenerator as described in the references, and a solution for remote control of switching a transmission loop ON and OFF.

Compared to the known way of HDSL, regenerator management according to the present invention enables the use of signal repeaters which still have the required practical functionality for management.

BRIEF DESCRIPTION OF THE DRAWINGS

In order to make the invention more readily understandable, the discussion that follows will refer to the accompanying drawings.

DETAILED DESCRIPTION

Figure 1:
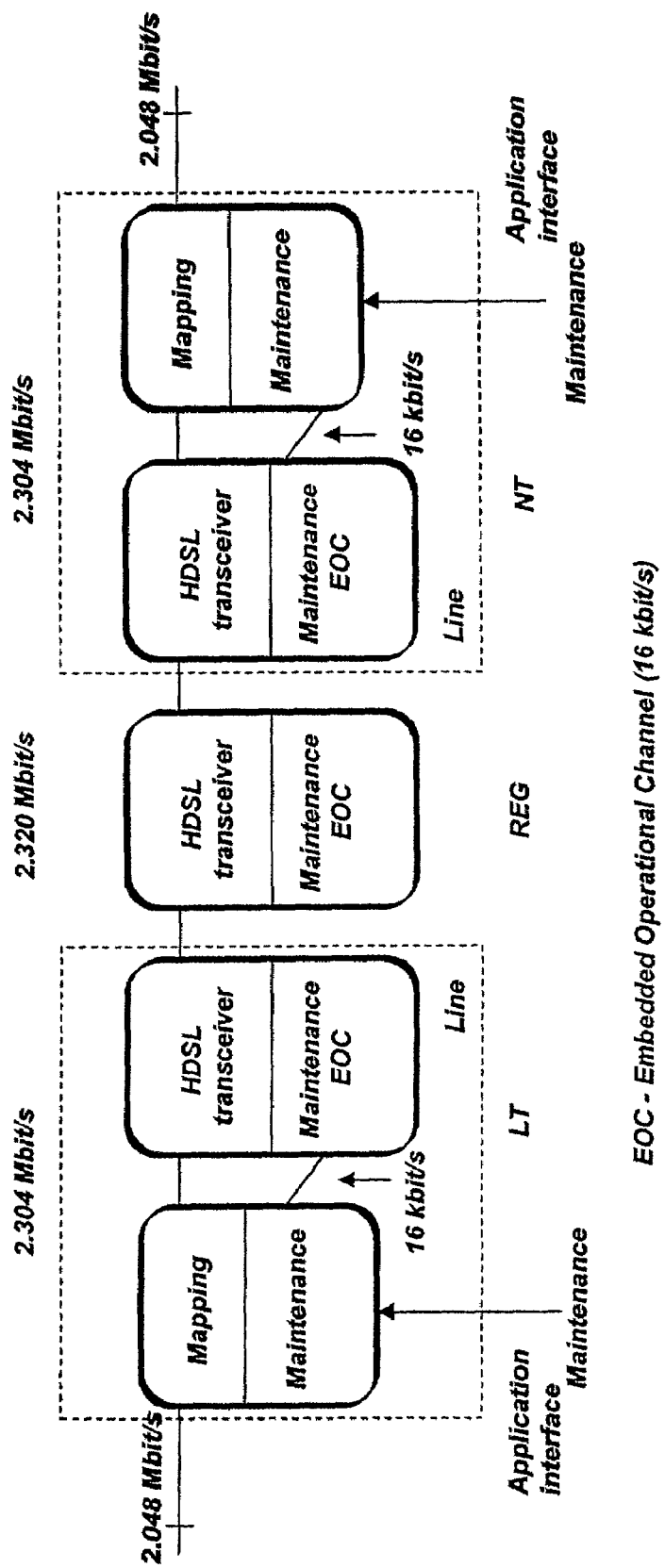
FIG. 1 shows a block diagram of an HDSL transmission system.
Figure 2:
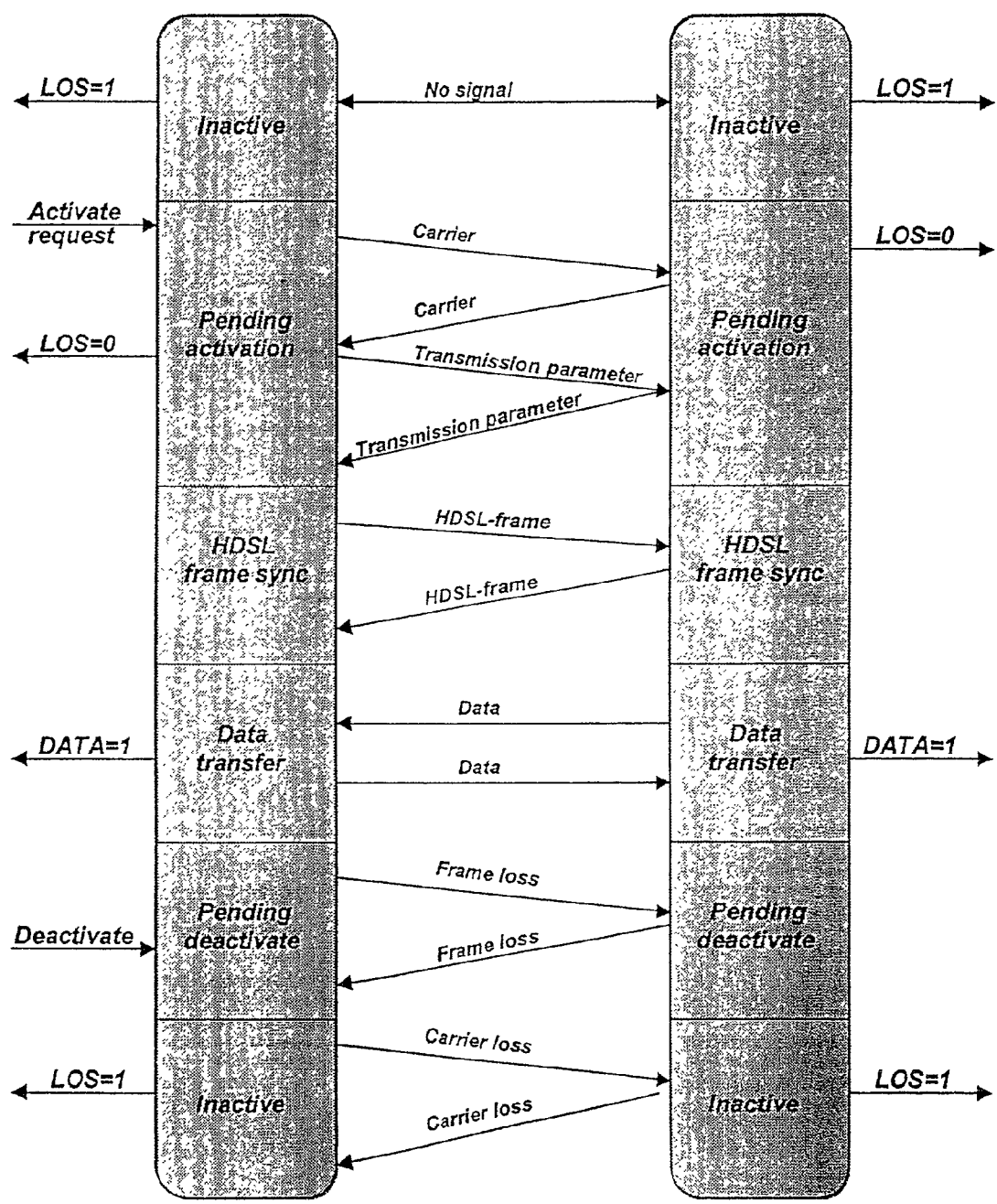
FIG. 2 shows a block diagram illustrating the activation/deactivation process for an HDSL line.
Figure 3:
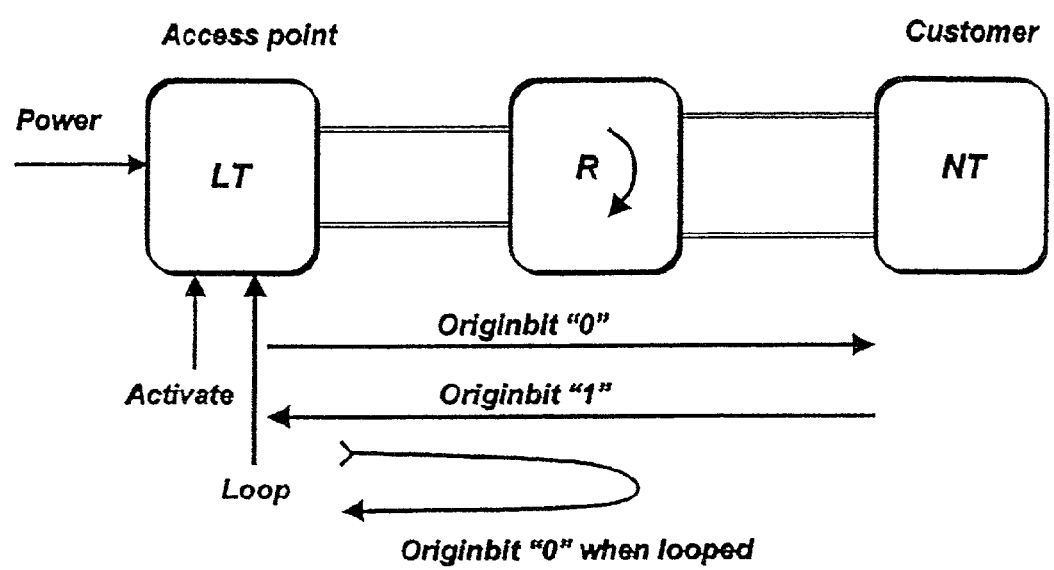
FIG. 3 shows a block diagram of an HDSL transmission system with the solution of the present invention implemented.

When starting up an HDSL transmission system like the one in FIG. 1, there is an activation sequence where transmission parameters are exchanged between the two endpoints of a transmission line. An HDSL transmission line activation/deactivation is shown in FIG. 2. The LT (Line terminal) is located e.g. at the central office and the NT (network terminal) is located on the customer premises.

When a regenerator between LT and NT is at present, the activation/deactivation is between the LT and REG and between the REG and NT. After successful parameter exchange, the transmission is defined to be active and data can be transferred between the endpoints. From active state, the transmission can be deactivated. This activation/deactivation process can be detected in the repeater and used to alternate the repeater to send data transparent between the LT and NT or do a loop back of transmitted data back to the LT.

According to the present invention, this alternation can be made in such a way that every time there is a deactivation/activation command from LT, a flip-flop in the repeater is being toggled. Flip-flop high can be interpreted as loop while flip-flop low is interpreted as transparency. The overhead channel is passing through the repeater between the endpoints LT-NT untouched.

The present invention makes use of one of the free bits in the overhead channel as an origin bit which is set to "1" in the upstream direction and "0" in the downstream direction, for thereby making it possible to detect at the access point (LT) whether there is a loop in the repeater or not by looking at the received origin bit. Origin bit "0" indicates loop while origin bit "1" indicates data transparency.

As the complete overhead channel is looped back, it is also possible to check the transmission quality by looking at the standardised HDSL error, monitoring in the same way as with a normal end-to-end connection.

The main advantage of the present invention is that it allows using passive repeaters for regeneration on the transmission line in an HDSL system, and still having the possibility for remote maintenance and management.

Another advantage is that passive repeaters are much less power consuming than conventional regenerators, and are also less complex and smaller.

Still another advantage of the present invention is that no data processing needs to be carried out in the repeater. All signals are simply amplified and passed through the repeater. Therefore, the delay introduced in the repeater is limited to a minimum. Also, the fact that the repeater does not need to have any significant software installed, contributes to minimizing the likelihood of errors, and the probable lifetime will increase.

What is claimed is:

1. An arrangement in a High speed Digital Subscriber Line (HDSL) communication system for fault isolation, comprising:

a line terminal, for transmitting a signal and for monitoring an embedded overhead channel between the line terminal and a network terminal that receives the signal;

the overhead channel for managing fault isolation between the line terminal and the network terminal; and a passive repeater, coupled to the overhead channel between the line terminal and the network terminal, for receiving and amplifying the signal from the line terminal and forwarding the amplified signal to the network, wherein an origin bit in the embedded overhead channel is set for upstream direction or downstream direction and an upstream origin bit detected at the line terminal having a different value from the set value indicates a loop.

2. The arrangement of claim 1, wherein the passive repeater comprises a flip-flop circuit that changes state when a deactivation/activation command from the line terminal is detected.

3. The arrangement of claim 2, wherein the flip-flop in a high state is interpreted as a loop and the flip-flop in a low state is interpreted as transparency.

4. The arrangement of claim 1, wherein the value of the origin bit of the upstream direction is one and the value of the origin bit of the downstream direction is zero.

5. The arrangement of claim 1, wherein the transmitted signal is passed through the passive repeater without terminating the signal and without regenerating the signal for transmission to the network terminal.

6. A method of fault isolation on High speed Digital Subscriber Line (HDSL) communication system, comprising the steps of:

monitoring an embedded operational channel (EOC) connected between a line terminal and a network terminal;

utilizing a passive repeater connected between the line terminal and the network terminal, wherein the passive repeater amplifies a signal from the line terminal and forwards the amplified signal to the network terminal; and detecting an origin bit in the EOC at the line terminal, wherein a value of the origin bit indicates a loop in the passive repeater.

7. The method of claim 6, further comprising
passing the signal through the passive repeater without terminating the signal and without regenerating the signal.

8. The method of claim 6, further comprising:
responsive to an deactivation/activation command from the line tertninal, changing the state of a flip-flop that is coupled with the passive repeater.

9. The method of claim 8, further comprising interpreting the state of the flip-flop, wherein a high state is interpreted as a loop and a low state is interpreted as transparency.

10. The method of claim 6, wherein the value of the origin bit of the upstream direction is one and the value of the origin bit of the downstream direction is zero.

* * * * *

UNITED STATES PATENT AND TRADEMARK OFFICE
CERTIFICATE OF CORRECTION

PATENT NO.         : 7,061,872 B2
APPLICATION NO. : 10/039929
DATED              : June 13, 2006
INVENTOR(S)        : Schumann-Olsen et al.

It is certified that error appears in the above-identified patent and that said Letters Patent is hereby corrected as shown below:

Column 4, Line 17, delete "tertninal" and insert -- terminal --, therefor.

Signed and Sealed this

Eighteenth Day of December, 2007

JON W. DUDAS
*Director of the United States Patent and Trademark Office*